United States Patent
Lee et al.

(10) Patent No.: US 11,695,367 B1
(45) Date of Patent: Jul. 4, 2023

(54) DAY-NIGHT PHOTOVOLTAIC SYSTEM

(71) Applicants: ADC Energy Co., Ltd., Incheon (KR); BOLTIER R&D, Long Beach, CA (US)

(72) Inventors: Soon Deuk Lee, Incheon (KR); Hun Yong Choe, Cerritos, CA (US)

(73) Assignees: BOLTIER R&D, Long Beach, CA (US); ADC Energy Co., Ltd., Incheon (KR)

( * ) Notice: Subject to any disclaimer, the term of this patent is extended or adjusted under 35 U.S.C. 154(b) by 0 days.

(21) Appl. No.: 17/726,814

(22) Filed: Apr. 22, 2022

(30) Foreign Application Priority Data

Apr. 4, 2022 (KR) .................. 10-2022-0041607

(51) Int. Cl.
*H02S 10/20* (2014.01)
*H02S 40/30* (2014.01)

(52) U.S. Cl.
CPC .............. *H02S 10/20* (2014.12); *H02S 40/30* (2014.12)

(58) Field of Classification Search
CPC .... H02S 40/30–34; H02S 10/20; H02S 40/32; H02S 40/34; H02S 40/345; H02S 40/36; H02S 40/38; H02S 50/10; H02S 99/00
See application file for complete search history.

(56) References Cited

U.S. PATENT DOCUMENTS

| | | | | |
|---|---|---|---|---|
| 2012/0280571 A1* | 11/2012 | Hargis | ...................... | G05F 1/67 307/77 |
| 2019/0165724 A1* | 5/2019 | Fernandez Luque | ... | H02S 40/30 |
| 2019/0190272 A1* | 6/2019 | Park | ........................ | H02J 3/381 |
| 2021/0111666 A1* | 4/2021 | Shkoury | ........... | H01L 31/02021 |

FOREIGN PATENT DOCUMENTS

| | | | | |
|---|---|---|---|---|
| CN | 106160651 A | * | 11/2016 | ............. H02S 40/30 |
| KR | 10-1740711 B1 | | 5/2017 | |

* cited by examiner

*Primary Examiner* — Ryan S Cannon
(74) *Attorney, Agent, or Firm* — NKL Law; Jae Youn Kim

(57) ABSTRACT

The present disclosure relates to a day-night photovoltaic system. More specifically, power supplied to a solar panel from a DC power supply part is output as a final output power PV together with power produced by the solar panel during the daytime, and is output as the final output power together with an ultra-high frequency wavelength generated by the sun explosion and induced to the solar panel during the night time. This provides the effects of stably supplying the power not only during the daytime but also during the night time.

7 Claims, 1 Drawing Sheet

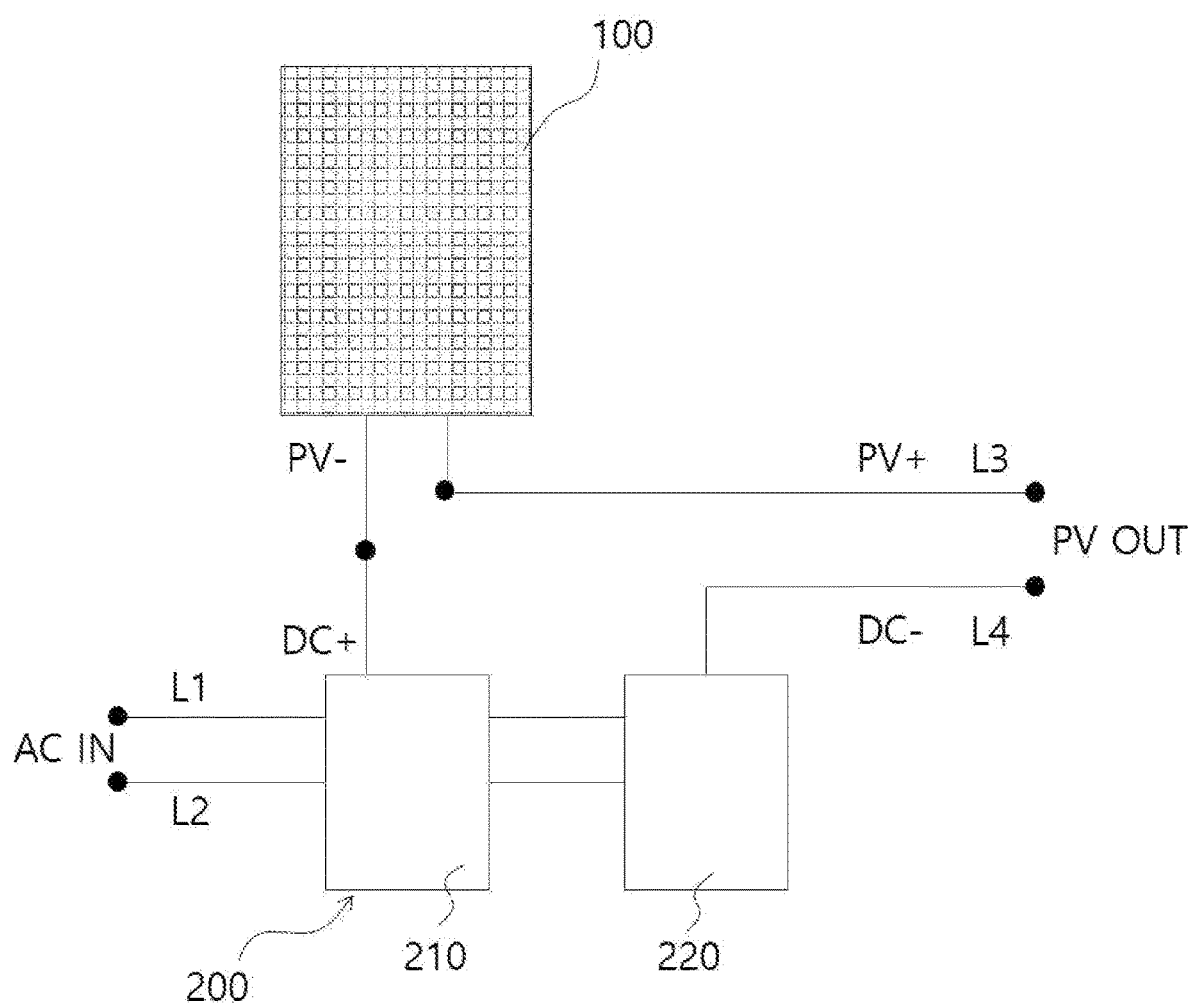

DAY-NIGHT PHOTOVOLTAIC SYSTEM

CROSS-REFERENCE TO RELATED APPLICATION

This application claims priority to and the benefit of Korean Patent Application No. 10-2022-0041607, filed on Apr. 4, 2022, the disclosure of which is incorporated herein by reference in its entirety.

TECHNICAL FIELD

The present disclosure relates to a day-night photovoltaic (PV) system. More specifically, power supplied to a solar panel from a direct current (DC) power supply part is output as a final output power PV together with power produced by the solar panel during the daytime, and is output as the final output power together with an ultra-high frequency wavelength generated by sun explosion and induced to the solar panel during the night time. This provides the effects of stably supplying the power not only during the daytime but also during the night time.

BACKGROUND

As technology advances and cultural life improves, energy is also being developed in an eco-friendly manner to adapt to climate change. Electric vehicles have already been developed to the stage where autonomous driving is possible. Electricity is being used instead of fossil fuels in various fields, such as battery-powered drones and robots.

A photovoltaic (PV) system is being developed in many countries to produce such electrical energy in an environmentally friendly manner. However, in a solar panel currently in use, electricity is produced only for 4-5 hours out of 24 hours a day, and the remaining 20 hours are left unattended.

Therefore, there is a need to develop a technology capable of improving efficiency by obtaining new energy from such an unattended solar panel.

PRIOR ART DOCUMENT

Patent Document

Patent Document 01: Korean Registration Patent No. 10-1740711 (May 22, 2017)

SUMMARY

The object of the present disclosure is to provide a day-night photovoltaic (PV) system which is capable of stably supplying power not only during the daytime but also during the night time by allowing power supplied to a solar panel from a direct current (DC) power supply part to be output as a final output power PV together with power produced by the solar panel during the daytime, and to be output as the final output power together with an ultra-high frequency wavelength generated by sun explosion and induced to the solar panel during the night time.

Further, another object of the present disclosure is to provide a day-night photovoltaic (PV) system which is capable of reusing a solar panel whose lifespan is approaching to be discarded, thus providing the effect of renewable energy, reducing a significant amount of costs required for the discard of the solar panel, and is useful in preventing air pollution by chemicals, metals, and the like.

Further, still another object of the present disclosure is to provide a day-night photovoltaic (PV) system capable of being installed in outdoors, indoors, or underground.

A day-night photovoltaic system according to the present disclosure includes: a solar panel configured to convert solar energy into electrical energy; and a direct current (DC) power supply part having a positive terminal connected to a negative terminal of the solar panel, and a negative terminal which forms an output voltage PV together with a positive terminal of the solar panel.

Further, the DC power supply part of the present disclosure includes a switching mode power supply (SMPS), an energy storage system (ESS), or a battery.

Further, an input voltage of the DC power supply part of the present disclosure is free, and an output voltage thereof is set to a voltage greater than a lowest voltage of a load device connected to the output voltage PV.

Further, the solar panel of the present disclosure is configured to be installed outdoors, indoors or underground.

According to the present disclosure, it is possible to allow power supplied to a solar panel from a direct current (DC) power supply part to be output as a final output power PV together with power produced by the solar panel during the daytime, and to be output as the final output power together with an ultra-high frequency wavelength generated by sun explosion and induced to the solar panel during the night time, thus stably supplying power not only during the daytime but also during the night time.

In addition, according to the present disclosure, it is possible to reuse a solar panel whose lifespan is approaching to be discarded, thus providing the effect of renewable energy, reducing a significant amount of costs required for the discard of the solar panel, and is useful in preventing air pollution by chemicals, metals, and the like.

In addition, a solar panel of the present disclosure can be utilized not only in places where the solar energy reaches but also in places where the solar energy does not reach. This makes it possible to install the solar panel in outdoors, indoors, or underground.

BRIEF DESCRIPTION OF THE DRAWINGS

FIG. 1 is a schematic diagram of a day-night photovoltaic (PV) system according to an embodiment of the present disclosure.

DETAILED DESCRIPTION

Hereinafter, an embodiment of the present disclosure will be described in detail with reference to the accompanying drawings.

A day-night photovoltaic (PV) system according to the present disclosure includes a solar panel 100 configured to convert solar energy into electrical energy, and a direct current (DC) power supply part 200 in which a positive (+) terminal thereof is connected to a negative (−) terminal of the solar panel 100 and a negative terminal thereof forms an output voltage PV together with a positive terminal of the solar panel 100.

The solar panel 100 serves to convert the solar energy into the electrical energy. The negative terminal of the solar panel 100 is connected to the positive terminal of the DC power supply part 200 and the positive terminal thereof forms the output voltage PV together with the negative terminal of the DC power supply part 200.

That is, the electrical energy generated from the solar energy in the solar panel 100 is combined with the electrical energy of the DC power supply part 200 and provided to a load device as the output voltage PV.

The DC power supply part 200 serves to supply DC power to the solar panel 100. To do this, the positive terminal of the DC power supply part 20 is connected to the negative terminal of the solar panel 100, and the negative terminal thereof forms the output voltage PV together with the positive terminal of the solar panel 100.

The DC power supply part 200 configured as above receives input power from an alternate current (AC) power supply or/and a DC power supply, rectifies and boosts the input power, and provides the same as DC power to the solar panel 100.

Specifically, the DC power supply part 200 is configured to include a switching mode power supply (SMPS) 210. The SMPS 210 may receive input power from lines L1 and L2 of the commercial power, which is AC. The SMPS 210 may output a stable DC power by converting an alternate current into a pulsating current, forming the pulsating current into a direct current through a smoothing circuit, converting the direct current into a high-frequency alternate current of several tens of kHz again, depressurizing the same to a necessary voltage using a high-frequency transformer, and passing the same through a rectifying circuit and the smoothing circuit. The SMPS 210, which receives an input voltage of a wide range and is not affected by a frequency, has a characteristic capable of operating even when not only AC power but also DC power is input thereto.

When the commercial AC power is converted into the DC power by the SMPS 210, an output voltage to be converted is determined by the maximum output voltage of the solar panel 100. As an example, in a case in which a final output voltage PV of the present disclosure is 240V at 10A, when the maximum output voltage of the solar panel 100 is DC 160V, the output voltage to be converted by the SMPS 210 becomes 240V−160V=80V. Further, since the capacity of the DC power supply part 200 is 240V*10 A=2,400 W, the capacity of the SMPS 210 needs to be at least 2.4 kW.

On the other hand, a means for supplying DC power to the solar panel 100 even when there is no commercial power or a power outage may be required. To support this, the present disclosure may be configured to further include an energy storage system (ESS) or a battery 220. The ESS or the battery 220 serves to supply the DC power to the solar panel 100 when no power based on the commercial power is supplied. Thus, the ESS or the battery 220 may preferably be set to have the same voltage as the output voltage to be converted by the SMPS 210 based on the above-mentioned commercial power. Under the same conditions as those in the above example, the output voltage of the ESS or the battery 220 becomes 80V. The power of the ESS or the battery 220 may be directly connected to the solar panel 100, or may be connected to the solar panel 100 through the SMPS 210. Further, the ESS or the battery 220 may be charged by receiving power from the SMPS 210. As shown in FIG. 1, a line L4, which is a negative terminal of the ESS or the battery 220, forms the final output voltage PV together with a line L3, which is the positive terminal of the solar panel 100.

The output voltage of the SMPS 210, the ESS or the battery 220 is preferably set to a voltage greater than the lowest voltage of the load device connected to the final output voltage PV of the day-night photovoltaic power supply system of the present disclosure. The reason for this is that when a voltage less than the minimum voltage of the load device is applied, an ON switch of the load device may not operate during the night time when there is little power output of the solar panel 100.

The state of use of the day-night photovoltaic power supply system of the present disclosure configured as described above will be now described. The power supplied to the solar panel 100 from the DC power supply part 200 is output as the final output power PV together with the power produced by the solar panel 100 during the daytime. When the production of power by sunlight increases, the power consumption of the DC power supply part 200 decreases, whereas when the production of power by sunlight decreases, the power consumption of the DC power supply part 200 increases. This compensates for the difference between the production of power by solar light and the power consumption of the DC power supply part 200, which makes it possible to easily adapt to climate change.

In addition, at the night time when sunlight-based power is not generated, ultra-high frequency wavelength caused by solar explosion is induced to the solar panel 100. At this time, the power supplied from the DC power supply part 200 to the solar panel 100 is output together with the ultra-high frequency wavelength induced to the solar panel 100 while passing through the solar panel 100. This provides a synergistic effect.

The final output voltage PV from the day-night photovoltaic system of the present disclosure is supplied as the input power of "AC and DC power supply" disclosed in U.S. Pat. No. 9,893,560 B2. Since the output voltage PV is continuously supplied, the PV voltage, it is possible to achieve the maximum efficiency even at voltage at sunrise when the sun rises and at sunset when the sun sets.

Further, the solar panel 100 whose lifespan is approaching to be discarded can be continuously reused. This provides the effect of renewable energy. Further, it is possible to reduce a significant amount of costs required for the discard of the solar panel 100. Further, the present disclosure is useful in preventing air pollution by chemicals, metals, and the like.

Further, the solar panel 100 of the present disclosure may be utilized not only in places where the solar energy reaches but also in places where the solar energy does not reach. This makes it possible to install the day-night photovoltaic system in outdoors, indoors, or underground.

EXPLANATION OF REFERENCE NUMERALS

100: Solar panel
200: DC power supply part
210: SMPS
220: ESS or battery

The invention claimed is:
1. A day-night photovoltaic system, comprising:
a solar panel configured to convert solar energy into an electrical energy;
a direct current (DC) power supply part having a positive terminal connected to a negative terminal of the solar panel, a negative terminal which forms an output voltage PV together with a positive terminal of the solar panel, and at least one external input terminal configured to receive an external input voltage,
wherein the DC power supply part comprises a switching mode power supply (SMPS) which is configured to receive the external input voltage, wherein the SMPS is configured to receive an alternate current (AC) as the external input voltage and convert is to a DC current, and the SMPS is configured to receive a DC current as the external input voltage and convert it to an AC current.

2. The day-night photovoltaic system of claim 1, wherein the DC power supply part further includes an energy storage system (ESS), or a battery.

3. The day-night photovoltaic system of claim 2, wherein an output voltage of the DC power supply part is set to a voltage greater than a lowest voltage of a load device connected to the output voltage PV.

4. The day-night photovoltaic system of claim 3, wherein the solar panel is configured to be installed outdoors, indoors or underground.

5. The day-night photovoltaic system of claim 1, wherein the positive terminal of the solar panel is directly connected to the output voltage PV without a connection to the DC power supply.

6. The day-night photovoltaic system of claim 1, wherein the SMPS comprises a smoothing circuit and is further configured to receive an alternate current (AC) as the external input voltage, convert the AC into a pulsating current, and form the pulsating current into a direct current (DC) through the smoothing circuit.

7. The day-night photovoltaic system of claim 1, wherein the SMPS comprises a frequency transformer, a rectifying circuit and a smoothing circuit, and the SMPS is further configured to receive a DC as the external input voltage, convert the DC into an AC, depressurize the AC to a predetermined voltage using the frequency transformer, and pass the depressurized AC through the rectifying circuit and the smoothing circuit.

\* \* \* \* \*